Aug. 8, 1950  E. A. SPRIGG  2,517,730
ROTARY SHAFT SEAL
Filed Jan. 26, 1948
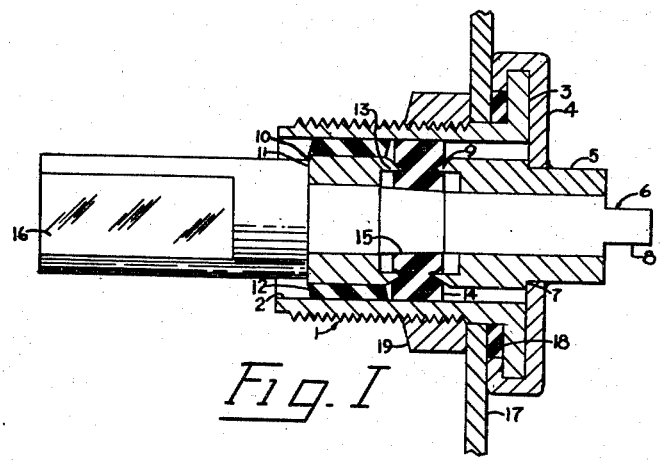
Fig. I
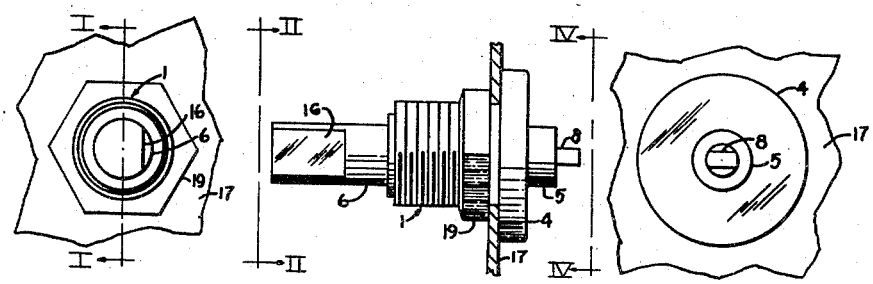
Fig. II    Fig. III    Fig. IV
INVENTOR.
Edward A. Sprigg
BY
Marshall and Marshall
ATTORNEYS Patented Aug. 8, 1950

2,517,730

UNITED STATES PATENT OFFICE 2,517,730

ROTARY SHAFT SEAL

Edward A. Sprigg, Toledo, Ohio, assignor to H. H. Buggie & Company, Toledo, Ohio, a corporation of Ohio Application January 26, 1948, Serial No. 4,409

2 Claims. (Cl. 286—11.13)

This invention relates to rotary shaft seals which are employed, for example, in radio and electronic devices where the actual mechanism of the device must be enclosed in a moisture-proof container and yet where external access to rotary shafts as, for example, condenser shafts, rheostat shafts and the like, must be provided.

The shafts of such instruments must rotate with very little torque to permit minute adjustments of the instruments during operation of the devices and yet if the knobs or handles by which the instrument shafts are rotated are to be accessible from the exterior of the devices, the shafts must be effectively sealed to prevent ingress of moisture which would damage the delicate parts of the devices.

It is the principal object of this invention to provide a rotary shaft seal which is simple in construction, which is quickly mountable in the panel of a radio or electronic device and which is, for all practical purposes, moisture-proof.

This and more specific objects and advantages will be apparent from the drawings, in which:

Figure I is a vertical sectional view on an enlarged scale of a rotary shaft seal embodying the invention.

Figure II is an end view in elevation from the interior of the device shown in Figure I but on a smaller scale.

Figure III is a side view in elevation of the device shown in Figure I.

Figure IV is an end view in elevation taken from the outside of Figure I or from the position indicated by the broken line IV—IV in Figure III.

A rotary shaft seal embodying the invention comprises, among other parts, a flanged shell 1 which is threaded on its exterior and has a central bore 2 extending through its length. A flange 3 of the shell 1 is snugly gripped in a disk-like cap 4 which is mechanically crimped over around the periphery of the flange 3. The cap 4 has an aperture concentrically located relative to the bore 2 of the shell 1 through which extends the front end of a shouldered collar 5. The collar 5 has a central bore through which protrudes the forward end of a rotary shaft 6. A shoulder 7 on the collar 5 tightly abuts the interior of the cap 4 and the collar and cap are press fitted to each other and then brazed or otherwise securely fastened. The outermost end of the shaft 6 is formed in a flattened tenon 8 to receive and securely mount a control knob or lever (not shown). The rear end of the collar 5 (left side, Figure I) is counterbored and beveled to form a sharp annular lip 9. The respective diameters of the portion of the shaft 6 which passes through the collar 5 and the center bore in the collar 5 are such as to provide just sufficient clearance to permit relative rotation of the two parts without perceptible friction.

Rearwardly on the shaft 6 there is mounted a second collar 10 which tightly abuts a shoulder 11 on the shaft and which is molded to an annular rubber-composition sealing member 12. The shaft 6 and collar 10 are relatively rotatable as are the shaft 6 and collar 5. The collar 10 at its forward end is provided with a counterbore and beveled periphery forming a sharp annular lip 13 identical to the lip 9 and located in opposition thereto. The exterior of the sealing member 12 is bonded to the interior of the shell 1.

The lips 9 and 13 press into opposite sides of a rotary seal 14 which is formed, preferably, of a graphite rubber compound having considerable hardness and but slight resiliency. The rotary seal 14 is tightly pressed onto a tapered portion 15 of the shaft 6 and rotates with the shaft 6.

The rear end of the shaft 6 has a larger diameter than the forward portions of the shaft 6 and is provided with a "flat" 16 on which the instruments or other devices to be driven by the shaft may be secured or coupled.

The rotary shaft seal is assembled in the case or on a panel 17 of the electronic device with which it is used by boring a single hole of sufficient size to receive the exterior of the shell 1. An annular sealing gasket 18 is then slipped over the rear of the shell 1 forwardly until it is adjacent the rear edge of the flange 3 and within the turned over lip of the cap 4. The shell 1 is then inserted through the bore in the panel 17 from the front and locked tightly in place by a lock nut 19 which is threaded onto the exterior of the shell 1. The nut 19 is tightened against the rear of the panel 17, compressing the gasket 18 and clamping the turned over lip of the cap 4 tightly against the front surface of the panel 17.

The gasket 18 effectively seals the shell 1 in the panel 17. The stationary sealing member 12 is of an outer diameter slightly larger than the interior diameter of the bore 2 and thus is placed under slight shearing tension during assembly. This effectively seals the aperture between the shaft and the member 12. The rotary seal 14, because of the action of the annular lips 9 and 13 tightly seals the aperture around those lips.

The cooperation of the sealing gasket 18, stationary sealing member 12 and rotary sealing member 14 provides a moisture-proof seal around the shaft 6 and yet permits rotation of the shaft 6 with an extremely low torque.

Figures II, III and IV illustrate the external appearance of a rotary shaft seal embodying the invention to more clearly show the relative location of the various parts comprising the device.

The embodiment of the invention which has been described may be modified to meet various requirements.

Having described the invention, I claim:

1. A moisture-proof rotary shaft seal comprising, in combination, an exteriorly threaded tubular shell having a flange on its outer end, a sealing gasket between the flange and the wall of the device into which said shaft extends, a lock nut threaded on the exterior of said shell on the side of said wall opposite to said gasket, a shaft extending through said shell and journaled therein by a pair of oppositely directed collars, the adjacent ends of said collars having sharp annular lips, said collars being non-rotatably sealed to said shell, and a rotary sealing member mounted on said shaft for rotation therewith and located between said lips with said lips pressed into the faces of said sealing member.

2. A moisture-proof rotary shaft seal comprising, in combination, an exteriorly threaded tubular shell having a circular flange on its outer end, a centrally bored circular cap crimped over the edge of said flange, a sealing gasket between the flange and the wall of the device into which said shaft extends, a lock nut threaded on the exterior of said shell on the side of said wall opposite said gasket, a shaft extending through said shell and journaled therein by a pair of oppositely directed collars, the adjacent ends of said collars having sharp annular lips, one of said collars extending through the bore in said cap and being non-rotatably sealed thereto, the other of said collars being molded to a resilient stationary annular sealing member, said stationary sealing member being molded to said shell, and a rotary sealing member mounted on said shaft for rotation therewith and located between said lips with said lips pressed into the faces of said sealing member.

EDWARD A. SPRIGG.

REFERENCES CITED

The following references are of record in the file of this patent:

UNITED STATES PATENTS

| Number | Name | Date |
| --- | --- | --- |
| 1,068,927 | Pribil | July 29, 1913 |
| 1,649,314 | Marden | Nov. 15, 1927 |